(12) United States Patent
Chin

(10) Patent No.: US 7,543,437 B1
(45) Date of Patent: Jun. 9, 2009

(54) LINK PLATE ASSEMBLY FOR A CHAIN

(75) Inventor: Chih-Chung Chin, Taichung (TW)

(73) Assignee: Tien Hsin Industries Co., Ltd, Taichung (TW)

( * ) Notice: Subject to any disclaimer, the term of this patent is extended or adjusted under 35 U.S.C. 154(b) by 0 days.

(21) Appl. No.: 12/058,749

(22) Filed: Mar. 30, 2008

(51) Int. Cl.
*F16G 13/06* (2006.01)
*F16G 15/06* (2006.01)

(52) U.S. Cl. .......................... 59/85; 59/4; 59/5; 59/84; 474/218; 474/220

(58) Field of Classification Search ............... 59/84, 59/85, 93, 4, 5; 474/418, 420, 218, 202
See application file for complete search history.

(56) References Cited

U.S. PATENT DOCUMENTS

| | | | | |
|---|---|---|---|---|
| 4,043,215 A | * | 8/1977 | Long et al. | 474/218 |
| D280,288 S | * | 8/1985 | Lickton | D8/499 |
| 5,291,730 A | * | 3/1994 | Wu | 59/85 |
| 5,299,416 A | * | 4/1994 | Wu | 59/85 |
| 5,305,594 A | * | 4/1994 | Wang | 59/85 |
| 5,362,282 A | * | 11/1994 | Lickton | 474/220 |
| 6,244,032 B1 | * | 6/2001 | Christmas et al. | 59/85 |

* cited by examiner

*Primary Examiner*—David B Jones

(57) ABSTRACT

A link plate assembly includes two first plate, two second plate, and two pins. The first plate includes a first aperture, a second aperture and a receiving aperture. Four convex portions facing the second plate are formed on the first plate. The second plate includes a first aperture and a second aperture. Two concave portions facing the first plate are formed on the second plate. One end of each pin is secured to the first aperture of the first plate. The other end of each pin includes a head portion and a groove portion. The head portion passes through the first aperture of the second plates and the receiving aperture of the other first plate. The groove portion passes through the second aperture of the first plate. The convex portions of the first plates contact with a non-concave part of the second plates when assembling. The convex portions coincide with the concave portions to disassemble the link plate assembly as the second plate is rotated relative to the first plate in a predetermined angle.

10 Claims, 3 Drawing Sheets

LINK PLATE ASSEMBLY FOR A CHAIN

FIELD OF THE INVENTION

The present invention relates to a link plate assembly for a bicycle chain, and particularly to a link plate assembly which minimizes the possibility of accidental disengagement and is assembled and disassembled easily.

BACKGROUND OF THE INVENTION

Referring to U.S. Pat. No. 5,362,282, "master chain link" is disclosed, in that a reusable master chain link for a derailleur chain is provided, which includes first and second parallel pins extending between first and second parallel plates. The first pin includes first and second heads at opposite ends thereof and the second pin also includes first and second heads at opposite ends thereof. The first and second plates have respective first and second apertures formed therein. The first and second apertures have respective narrow circular portions narrower than the respective first heads of the first and second pins. The narrow circular portions further include respective countersinks formed therein for receiving and substantially concealing the respective first heads of the first and second pins and substantially concealing the first heads within the respective narrow circular portions. The first and second apertures further include respective wide circular portions wider than the respective first heads of the first and second pins. The respective wide circular portions are connected to the respective narrow circular portions by an elongated slot to permit movement of the respective first heads therebetween. The respective second heads of the first and second pins are integrally connected by laser welds to the respective second and first plates.

Above mentioned structure provides the countersinks for concealing the first heads of the first and second pins, it still has some drawbacks. First, the prior art doesn't overcome the problem of disengagement. Due to the lack of force pushing the plate outward the first head won't engage with the countersink. The first head will still move between the narrow circular portion and the wide circular portion. This will increase the possibility of disengagement. Second, the prior art has the problem of strength. The cutting-off area of the plate is increasing due to the elongated slot. The strength of the plate will decrease.

SUMMARY OF THE INVENTION

Accordingly, the primary object of the present invention is to provide a link plate assembly for a bicycle chain, wherein the structure is simple so that the rider and user can assemble or disassembly the chain easily and quickly without using special tools. Furthermore the anti-disengagement structure is provided.

To achieve above objects, the present invention provides a link plate assembly, comprising: at least one first plate having a first aperture, a second aperture and a receiving aperture, at least one convex portion formed on the first plate; at least one second plate having a first aperture and a second aperture, at least one concave portion formed on the second plate; at least one pin having one end secured to the first aperture of the first plate and the other end having a head portion and a groove portion, a diameter of the head portion being less than a diameter of the receiving aperture and a diameter of the first aperture of the second plate such that the head portion passes through the receiving aperture and the first aperture of the second plate, the diameter of the head portion being greater than a diameter of the second aperture of the first plate to block the head portion, a diameter of the groove portion being less than the diameter of the second aperture of the first plate such that the groove portion passes through the second aperture of the first plate; and wherein the at least one convex portion faces the second plate and the at least one concave portion faces the first plate; the at least one convex portion of the first plate contacts with a non-concave part of the second plate when assembling the link plate assembly; the at least one convex portion of the first plate coincides with the at least one concave portion of the second plate to disassemble the link plate assembly as the second plate is rotated relative to the first plate in a predetermined angle.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 5, a link plate assembly according to the present invention is illustrated. The link plate assembly includes two first plates 10, four second plates 20, and two pins 30.

Figure 1:
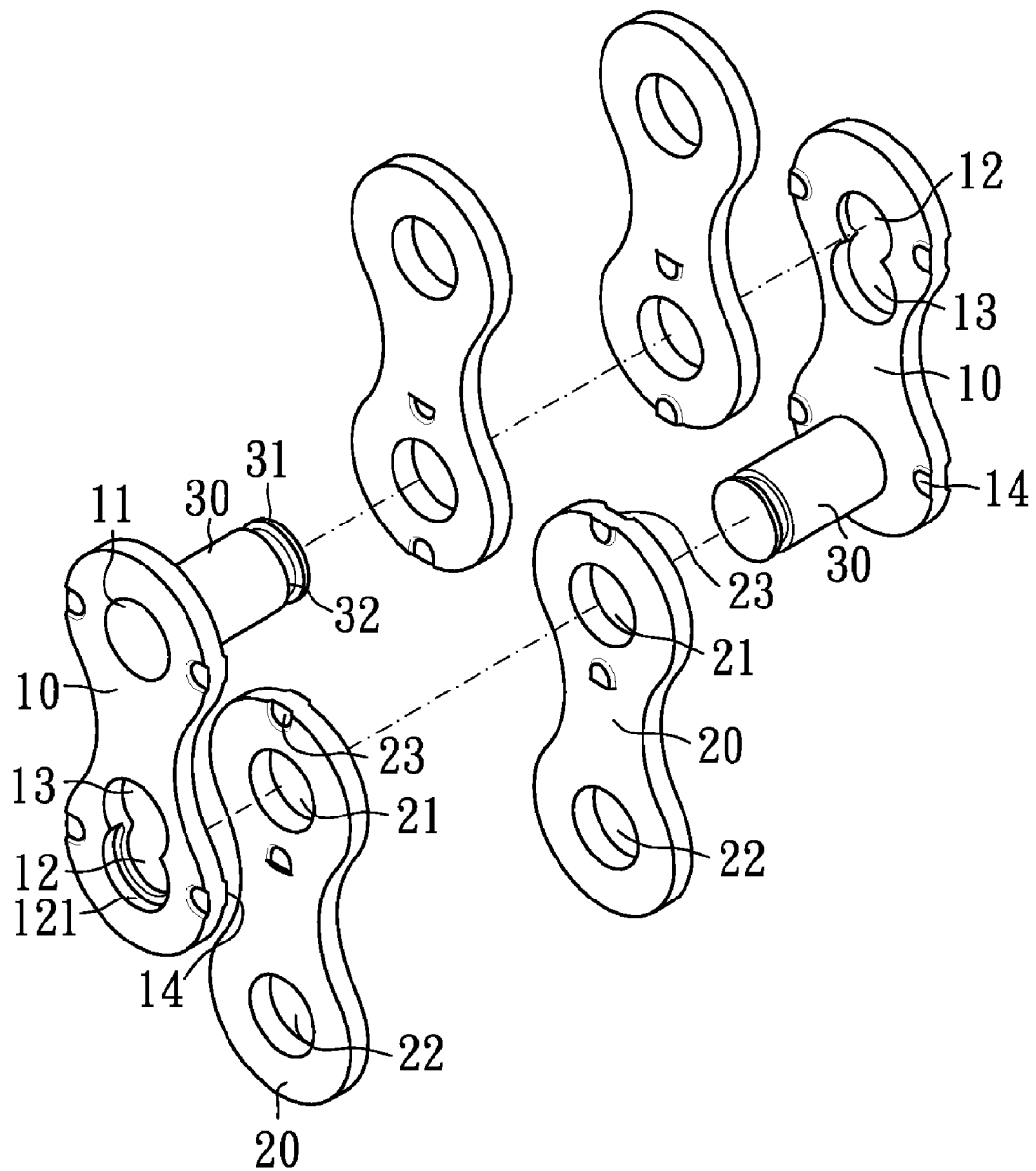
FIG. 1 is an exploding view of a link plate assembly according to the present invention.

Referring to FIG. 1, each of the first plates 10 includes a first aperture 11, a second aperture 12 and a receiving aperture 13. The receiving aperture 13 connects to second aperture 12 and the diameter of the receiving aperture 13 is greater than the diameter of the second aperture 12. Four convex portions 14 facing the second plate 22 are formed on the first plate 10. Two of the convex portions 14 are positioned annularly about the first aperture 11 and the line joining the convex portions 14 is perpendicular to the line joining the first aperture 11 and the second aperture 12. The others of the convex portions 14 are positioned annularly about the second aperture 12 and the line joining the convex portions 14 is perpendicular to the line joining the first aperture 11 and the second aperture 12. The second aperture 12 of the first plate 10 includes a countersink 121.

Each of the second plates 20 includes a first aperture 21 and a second aperture 22. Two concave portions 23 facing the first plate 10 are formed on the second plate 20 and positioned annularly about the first aperture 21 of the second plate 20. The line joining the concave portions 23 is collinear to the line joining the first aperture 21 and the second aperture 22.

One end of each of the pins 30 is secured to the first aperture 11 of the first plate 10. The other end of the pin 30 includes a head portion 31 and a groove portion 32. The diameter of the head portion 31 is less than the diameter of the receiving aperture 13 and the diameter of the first aperture 21 of the second plate 20 such that the head portion 31 passes through the receiving aperture 13 and the first aperture 21 of the second plate 20. The diameter of the head portion 31 is greater than the diameter of the second aperture 12 of the first plate 10 to block the head portion 31. The diameter of the groove portion 32 is less than the diameter of the second aperture 12 of the first plate 10 such that the groove portion 32 passes through the second aperture 12 of the first plate 10.

Figure 4:
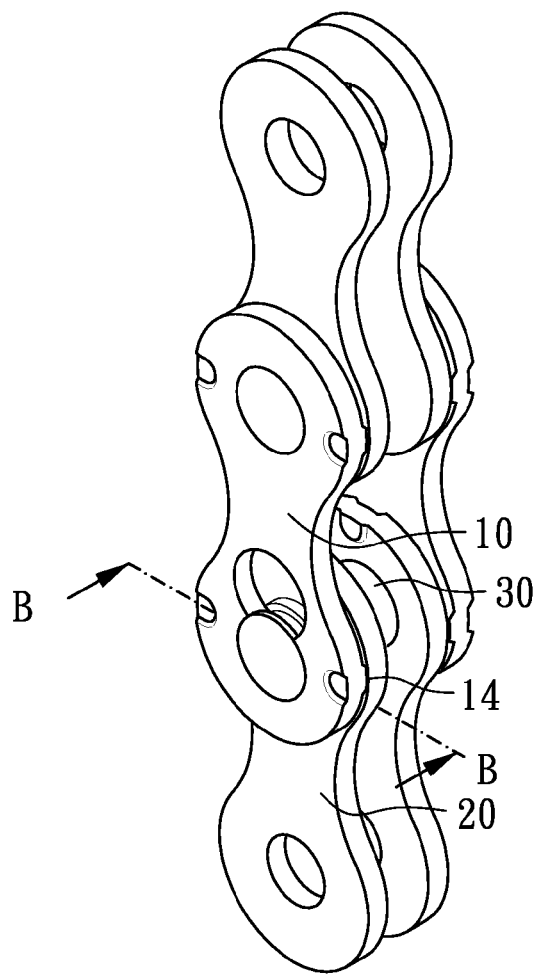
FIG. 4 is a perspective view of the link plate assembly according to the present invention which shows the convex portions of the first plates contacted with the non-concave part of the second plates.
Figure 5:
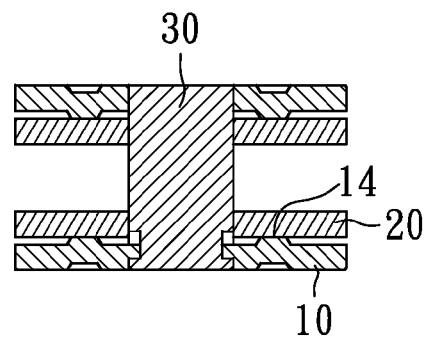
FIG. 5 is a section view taken along the line B-B in FIG. 4.

To assembly the link plate assembly, the pins 30 secured to the first plate 10 pass through the first aperture 21 of two second plates 20, into the receiving aperture 13 of the other first plate 10 simultaneously. Then push the groove portions 32 of the pins 30 into the second apertures 12 of the first plates 10 simultaneously and the head portions 31 conceal in the countersinks 121 as shown in FIG. 4. The convex portions 14 of the first plates 10 contact with the non-concave part of the second plates 20 as shown in FIG. 5 when assembling the link plate assembly. In general, the inward movement of the second plates 20 is constrained by the rollers or pins, so the first plates 10 are pushed outward relatively. The head portion 31 is engaged with the second aperture 12 of the first plate 10. This minimizes the possibility of disengagement. Furthermore, a predetermined angle is defined by the angle between the line joining the convex portions 14 positioned around the second aperture 12 of the first plate 10 and the line joining the concave portions 23 positioned around the first aperture 21 of the second plate 20 as the line joining the first aperture 11 and the second aperture 12 in the first plate 10 is collinear to the line joining the first aperture 21 and the second aperture 22 in the second plate 20. In this embodiment the predetermined angle is 90 degree. In general, the angle between the first plate 10 and the second plate 20 is less than 90 degree as driving the chain. The convex portions 14 keep contacting with the non-concave part of the second plate 20 as driving the chain to prevent the chain link assembly from disengaging.

In addition the countersink 121 is provided for increasing the effort of engagement between the head portion 31 and the first plate 10. As the head portion 31 concealing in the countersink 121, it also prevents the head portion 31 from interference with other parts.

Figure 2:
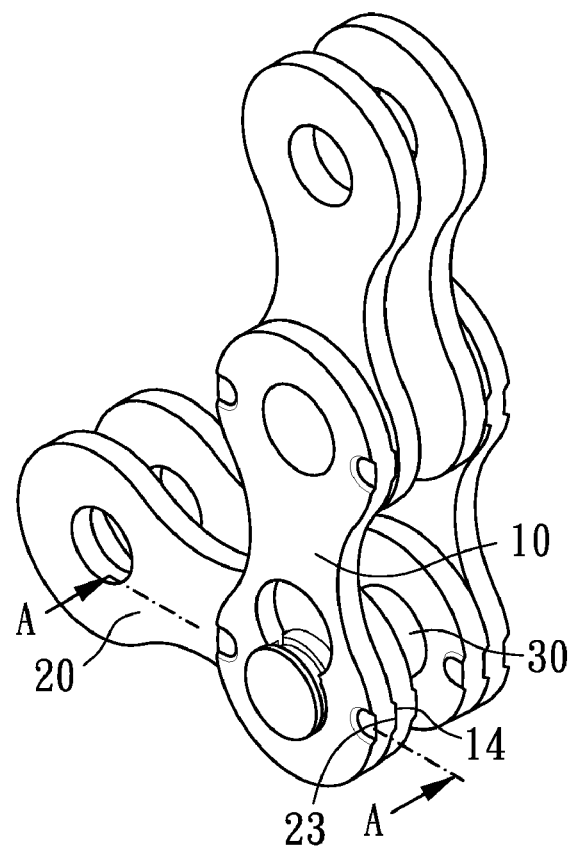
FIG. 2 is a perspective view of the link plate assembly according to the present invention which shows the convex portions of the first plates coincided with the concave portions of the second plates.
Figure 3:
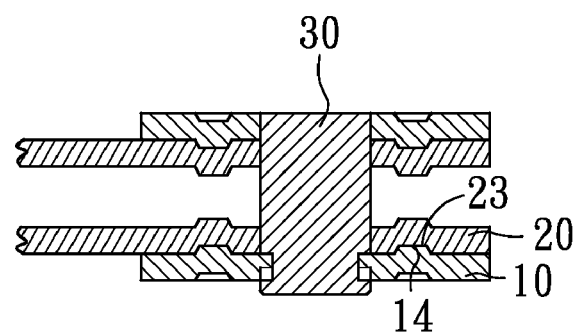
FIG. 3 is a section view taken along the line A-A in FIG. 2.

To disassembly the link plate assembly, the second plate 20 is rotated relative to the first plate 10 in 90 degree as shown in FIG. 2. The convex portions 14 of the first plates 10 coincide with the concave portions 23 of the second plates 20 as shown in FIG. 3. And the head portion 31 disengages with the first plate 10. The force pushing the first plate 10 outward is eliminated. Then push the groove portion 32 of the pin 30 into the receiving aperture 13

In other embodiment according to the prevent invention, the positions of convex portion and concave portion are interchanged. The concave portions facing the second plate are formed on the first plate and the convex portions facing the first plate are formed on the second plate. This results in the same efforts.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A link plate assembly, comprising:
   at least one first plate having a first aperture, a second aperture and a receiving aperture, at least one convex portion formed on the first plate;
   at least one second plate having a first aperture and a second aperture, at least one concave portion formed on the second plate;
   at least one pin having one end secured to the first aperture of the first plate and the other end having a head portion and a groove portion, a diameter of the head portion being less than a diameter of the receiving aperture and a diameter of the first aperture of the second plate such that the head portion passes through the receiving aperture and the first aperture of the second plate, the diameter of the head portion being greater than a diameter of the second aperture of the first plate to block the head portion, a diameter of the groove portion being less than the diameter of the second aperture of the first plate such that the groove portion passes through the second aperture of the first plate; and
   wherein the at least one convex portion faces the second plate and the at least one concave portion faces the first plate; the at least one convex portion of the first plate contacts with a non-concave part of the second plate when assembling the link plate assembly; the at least one convex portion of the first plate coincides with the at least one concave portion of the second plate to disassemble the link plate assembly as the second plate is rotated relative to the first plate in a predetermined angle.

2. The link plate assembly as claimed in claim 1, wherein four convex portions are formed on the first plate, two of the convex portions are positioned annularly about the first aperture of the first plate, the others of the convex portions are positioned annularly about the second aperture of the first plate.

3. The link plate assembly as claimed in claim 1, wherein two concave portions are formed on the second plate and positioned annularly about the first aperture of the second plate.

4. The link plate assembly as claimed in claim 1, wherein the second aperture of the first plate includes a countersink to conceal the head portion.

5. The link plate assembly as claimed in claim 1, wherein the predetermined angle is equal to 90 degree.

6. A link plate assembly, comprising:
   at least one first plate having a first aperture, a second aperture and a receiving aperture, at least one concave portion formed on the first plate;
   at least one second plate having a first aperture and a second aperture, at least one convex portion formed on the second plate;
   at least one pin having one end secured to the first aperture of the first plate and the other end of the pin having a head portion and a groove portion, a diameter of the head portion being less than a diameter of the receiving aperture and a diameter of the first aperture of the second plate such that the head portion passes through the receiving aperture and the first aperture of the second plate, the diameter of the head portion being greater than a diameter of the second aperture of the first plate to block the head portion, a diameter of the groove portion being less than the diameter of the second aperture of the first plate such that the groove portion passes through the second aperture of the first plate; and wherein the at least one concave portion faces the second plate and the at least one convex portion faces the first plate; the at least one convex portion of the second plate contacts with a non-concave part of the first plate when assembling the link plate assembly; the at least one concave portion of the first plate coincides with the at least one convex portion of the second plate to disassemble the link plate assembly as the second-plate is rotated relative to the first plate in a predetermined angle.

7. The link plate assembly as claimed in claim 6, wherein four concave portions are formed on the first plate, two of the concave portions are positioned annularly about the first aperture of the first plate, the others of the concave portions are positioned annularly about the second aperture of the first plate.

8. The link plate assembly as claimed in claim 6, wherein two convex portions are formed on the second plate and positioned annularly about the first aperture of the second plate.

9. The link plate assembly as claimed in claim 6, wherein the second aperture of the first plate includes a countersink to conceal the head portion.

10. The link plate assembly as claimed in claim 6, wherein the predetermined angle is equal to 90 degree.

* * * * *